US006883389B2

(12) United States Patent
Eldridge

(10) Patent No.: US 6,883,389 B2
(45) Date of Patent: Apr. 26, 2005

(54) FLOW AVERAGING TUBE AND METHOD OF USING SAME

(75) Inventor: Mark F. Eldridge, Monterey, CA (US)

(73) Assignee: Eldridge Products, Inc., Monterey, CA (US)

( * ) Notice: Subject to any disclaimer, the term of this patent is extended or adjusted under 35 U.S.C. 154(b) by 0 days.

(21) Appl. No.: 10/644,842

(22) Filed: Aug. 21, 2003

(65) Prior Publication Data

US 2005/0039545 A1 Feb. 24, 2005

(51) Int. Cl.$^7$ .............................................. G01F 1/46
(52) U.S. Cl. ................................................ 73/861.65
(58) Field of Search ........................ 73/861.65, 861.66, 73/861.4

(56) References Cited

U.S. PATENT DOCUMENTS

| 3,803,921 | A | * | 4/1974 | Dieterich | 73/203 |
|---|---|---|---|---|---|
| 4,154,100 | A | | 5/1979 | Harbaugh et al. | 73/212 |
| 4,703,661 | A | | 11/1987 | Evers | 73/861.66 |
| 4,961,349 | A | | 10/1990 | Tanis | 73/861.52 |
| 5,233,865 | A | * | 8/1993 | Rossow | 73/147 |
| 5,442,958 | A | * | 8/1995 | Hagen | 73/170.02 |
| 5,773,726 | A | * | 6/1998 | Mahoney et al. | 73/861.65 |
| 5,913,250 | A | * | 6/1999 | Wible | 73/861.65 |
| 6,164,143 | A | | 12/2000 | Evans | 73/861.65 |

* cited by examiner

Primary Examiner—Edward Lefkowitz
Assistant Examiner—Jewel Thompson
(74) Attorney, Agent, or Firm—Birch, Stewart, Kolasch & Birch, LLP

(57) ABSTRACT

A flow meter of the pitot type. The meter incorporates a series of apertures along a probe body for exposure to a fluid stream. The result is a number of datum which are averaged and correlated to be representative of the flow within a conduit. Aberrations encountered in noncircular ducting or other irregularities are compensated by correction. The disclosure further sets forth the use of an apparatus to effect the measurements.

14 Claims, 4 Drawing Sheets

FLOW AVERAGING TUBE AND METHOD OF USING SAME

CROSS-REFERENCE TO RELATED APPLICATIONS

This is the first application filed for the present invention.

FIELD OF THE INVENTION

The present invention relates to a flow measuring device and more particularly, the present invention relates to a probe for measuring fluid flow at a plurality of locations with the data being averaged to ascertain fluid flow with greater precision.

BACKGROUND OF THE INVENTION

Flow measurement technology is quite mature in the art as is evinced by the innumerable patents granted for this field.

Generally, pitot type tubes are employed for making flow determinations. An example is found in U.S. Pat. No. 6,164,143, issued Dec. 26, 2000, to Evans. The disclosure relates to a tip flow barrier for a pitot type flow meter. There is provided a barrier for preventing undesirable fluid flow between a tip portion of the probe and the inside of a pipe within which it is placed.

Tanis, in U.S. Pat. No. 4,961,349, issued Oct. 9, 1990, provides a flow meter operating on a hydraulic grade differential determined by fluid pressure in a reduced cross sectional area of the meter and the fluid through the conduit in which the meter is positioned.

U.S. Pat. No. 4,154,100, issued to Harbaugh et al., May 15, 1979, relates to a method and apparatus for stabilizing the flow coefficient for pitot-type flow meters with a downstream facing port. In the device, the system employs an averaging pitot-type flow meter which provides a flow deflector with sharply contoured edges to fix the location at which a boundary layer separation occurs over a broad range of laminar and turbulent flow conditions.

Although the arrangement is a flow averaging arrangement, the device is still dependent upon position of the low pressure ports on the downstream side of the body together with shaping and positioning the downstreams such as the boundary layer separation points cannot become reattached.

Mahoney et al., in U.S. Pat. No. 5,773,726, issued Jun. 30, 1998, provides a flow meter of the pitot variety with a temperature sensor. The flow meter is designed for mass flow measurement and provides a body for insertion into a confined conduit. The body provides separated plenums with openings provided in the body which expose the plenums to high and low fluid pressure during fluid flow through the conduit. A temperature sensor is disposed within the body of the probe.

In U.S. Pat. No. 4,703,661, issued Nov. 3, 1997 to Evers, there is provided a differential pressure flow probe which provides leading edges having dynamic pressure apertures and a sensor for static pressure with one of the sensors formed in the rear edge of the body, the sensor aperture is located in the wake of the body with the front surfaces swept back from a forward tip and provided with detachment ridges for the lateral detachment of the incident fluid flow without subsequent reattachment.

In this art, there is a great concern in the previously proposed arrangements for disruption of the fluid flow and more particularly a separation of the fluid as it contacts the flow meter. To this end, numerous designs have been configured in the prior art to present a more aerodynamic flow meter with a probe together with other ancillary features such as temperature sensors, inter alia.

It would be desirable if there were a flow averaging probe which was not susceptible to probe shape or positioning within a duct. In reality, it is evident that fluid flow is often required for measurement in irregularly shaped conduits. Such geometrical irregularity presents complex flow patterns, turbulence and other observations in the fluid flow which can adversely effect an accurate measurement. The prior art arrangements were effected by such conditions and required position, reattachment or non reattachment of the separated fluid lines among a host of other difficulties. The present invention seeks to overcome these limitations and provide effective apparatus and measurement system for measuring fluid flow within a conduit.

SUMMARY OF THE INVENTION

One object of the present invention is to provide improved fluid flow meter of the pitot-type incorporating flow averaging together with a method of effecting use of such a flow meter.

In accordance with a further object of one embodiment of the present invention there is provided a flow averaging probe for measuring fluid flow, comprising:
  an elongate probe;
  a plurality of apertures disposed on the probe for receiving impact pressure of fluid flow therethrough;
  sensor means adjacent the apertures for sensing the flow caused by impact pressure;
  transmitter means for transmitting sensed data from the sensors; and
  signal processing means for processing transmitted data.

It has been found that by positioning a sensor within or in line with the probe body, which probe body has a plurality of spaced apart apertures, more accurate readings can be obtained with the probe when the same is in contact with a fluid flow. Generally speaking, in the prior art the sensors were not disposed directly in contact with the pressure front, but in representative designs, the sensors were positioned in a low pressure zone of the probe typically where reattachment of the lamina occurred.

As an example, it has been found that the apertures may have a large diameter, an example of which may be 0.125 inches along the length of the upstream impact surface of probe.

Conveniently, the electronics for the probe may be encased in an explosive proof housing. The transmitter may be of the thermal dispersion type (RTD) and signal processor may be an analog or digital microprocessor.

A further object of one embodiment of the present invention is to provide a flow averaging probe for measuring fluid flow in a conduit, comprising in combination:
  a conduit for transporting a fluid;
  an elongate hollow probe releasably connected within the conduit;
  a plurality of apertures disposed on the probe for receiving fluid flow therethrough;
  sensor means proximate the apertures for sensing accumulated fluid flow;
  transmitter means for transmitting sensed data from the sensors;
  signal processing means for processing transmitted data; and
  discharge means for discharging fluid sensed by the sensor means and of the probe.

The conduit will typically carry a gas for measuring flow and the conduit can be found in any conduit system carrying a gas such as heating ventilation and air conditioning (HVAC), variable air volume (VAV) applications among others well appreciated by those skilled in the art.

In a further object of one embodiment of the present invention there is provided a method of measuring fluid flow in a conduit, comprising:

providing a probe having a hollow elongate body with a plurality of apertures therethrough and sensor means proximate the apertures, the apertures for receiving fluid therethrough;

positioning the probe within a fluid stream to be measured;

collating individual fluid streams from the apertures within the probe;

activating the sensor means by fluid entering the apertures to obtain data generated by a collated stream; and averaging obtained data to determine a representative flow rate.

Generally speaking, by retaining sensors within the body of the probe, successful results have been achieved when this feature is combined with apertures being spaced apart equidistantly or substantially equidistantly from one another for the collection of individual datum. The spacing will depend on the environment in which the probe is used and the needs of the user. As a particularly convenient feature, several of the units set forth herein can be grouped or inter connected and the data along a pipe line can be subsequently globally averaged to provide a particularly accurate flow result over a broad distance of the conduit. In terms of materials of which the probe may be made, it will be appreciated by those skilled in the art that the material will be selected to not be reactive with the fluid within which it will be disposed for a measurement and preferred materials would include, for example, stainless steel, ABS plastic, high impact polystyrene, polyvinylchloride, etc.

In respect of the sensors, these may comprise sensors of the type thermal, turbine, venturi, nozzle, oriface plate, variable area, paddle wheel, target, coriolis, vortex shedder, ultrasonic, magnetic, Doppler, time of flight, propeller, laser, etc.

Having thus generally described the invention, reference will now be made to the accompanying drawings illustrating preferred embodiments.

BRIEF DESCRIPTION OF THE DRAWINGS

Similar numerals denote similar elements.

DETAILED DESCRIPTION OF THE PREFERRED EMBODIMENT

Figure 1:
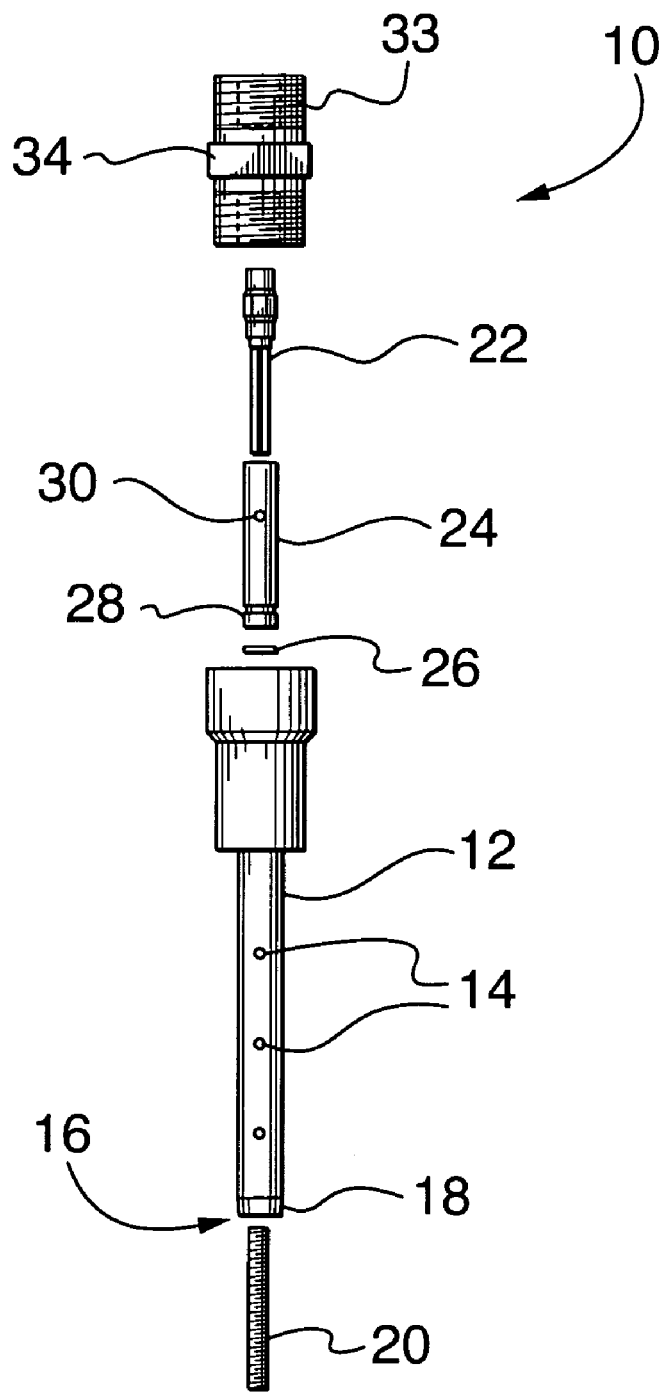
FIG. 1 is an exploded view of one embodiment of the probe according to the present invention.
Figure 2:
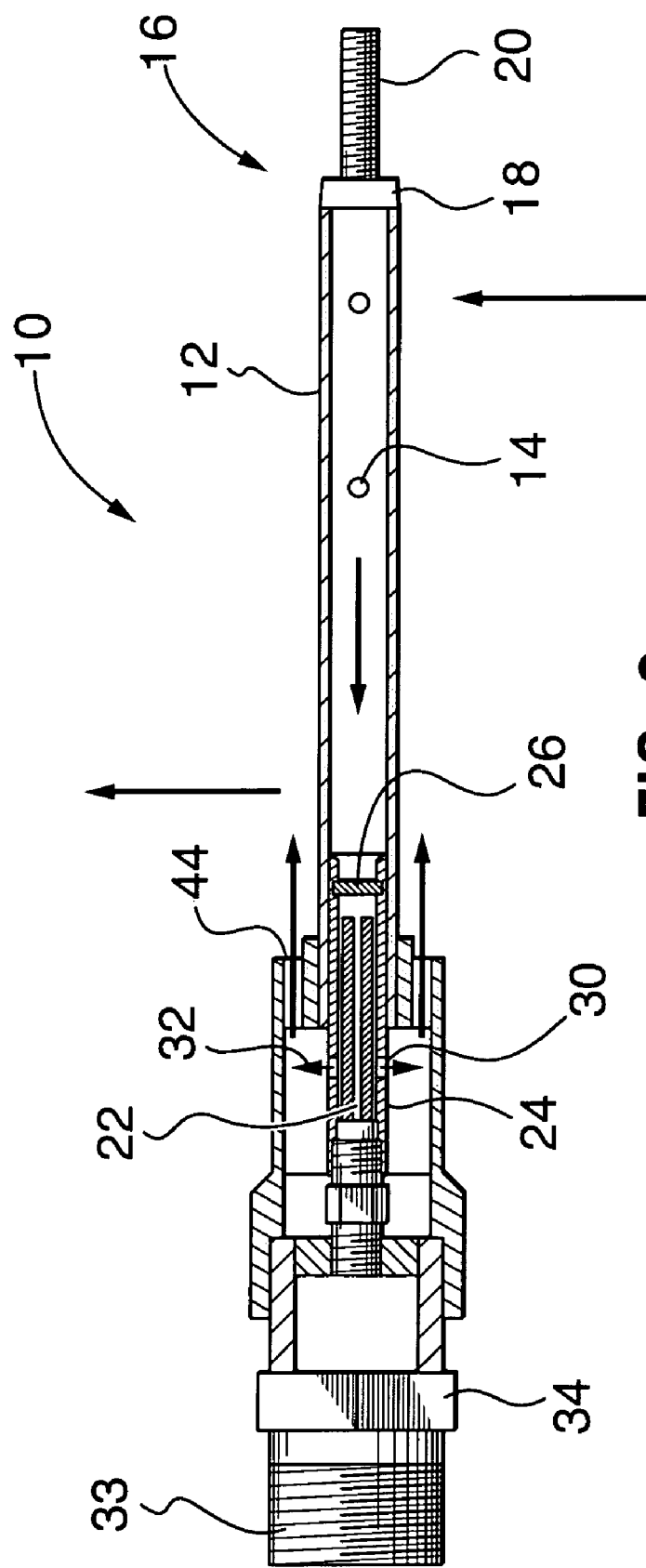
FIG. 2 is a longitudinal cross-sectional view along line 22 of FIG. 1.

Referring now to the Figures, numeral 10 globally denotes the probe as shown in the example. The probe 10 includes a tube 12 which is elongate and hollow and includes a plurality of apertures 14 extending along the length thereof and in communication with the hollow interior of the tube 12. The apertures are equidistantly or otherwise preferably spaced from one another and allow communication from the exterior of the tube 12 to the interior thereof as illustrated in FIG. 2 where gas flows through the apertures 14 to within the tube 12. The terminal end 16 of tube 12 includes a solid end 18 which may receive a threaded member 20 in order to fasten the overall probe 10 into position as shown in FIG. 3 and discussed hereinafter in greater detail.

Disposed within the interior of the tube 12 is a sensor 22 which is coaxially positioned within a sensor window and protection device 24. Optionally, a seal, typically in the form of an O-ring 26 locates the sensor window within the tube 12 so that it is positioned correctly as shown in FIG. 2. The sensor window 24 may include a seating 28 to receive O-ring 26. Sensor window 24 includes an aperture 30 extending therethrough to facilitate sensing of any fluid coming within the vicinity of the arrows designated by numeral 32. A bushing 33 is threaded and received within a top portion of tube 12. This is more clearly illustrated in FIG. 2. The bushing 33 also has a top threaded segment and a hex nut 34 to remediate the threaded portion. This facilitates a connection with a meter for monitoring a gas flow. Such a meter is shown in FIGS. 3 and 4 and represented by numeral 36. As is illustrated, all of the individual components are effectively positioned in a coaxial relationship and within the probe body 12. This is a particularly beneficial design feature since the key elements of the structure are protected within the body of the probe tube 12.

In terms of suitable materials, the choice for tube body 12 will completely depend upon the nature of the fluid in which the probe is inserted. In some instances it may be adequate to use suitable plastics such as HIPS, PVC, HDPE, and PVF inter alia. In situations where organic vapors are present, the use of synthetic materials may not be appropriate. In this instance, various metals may be incorporated into the body as will be appreciated by those skilled in the art.

Figure 3:
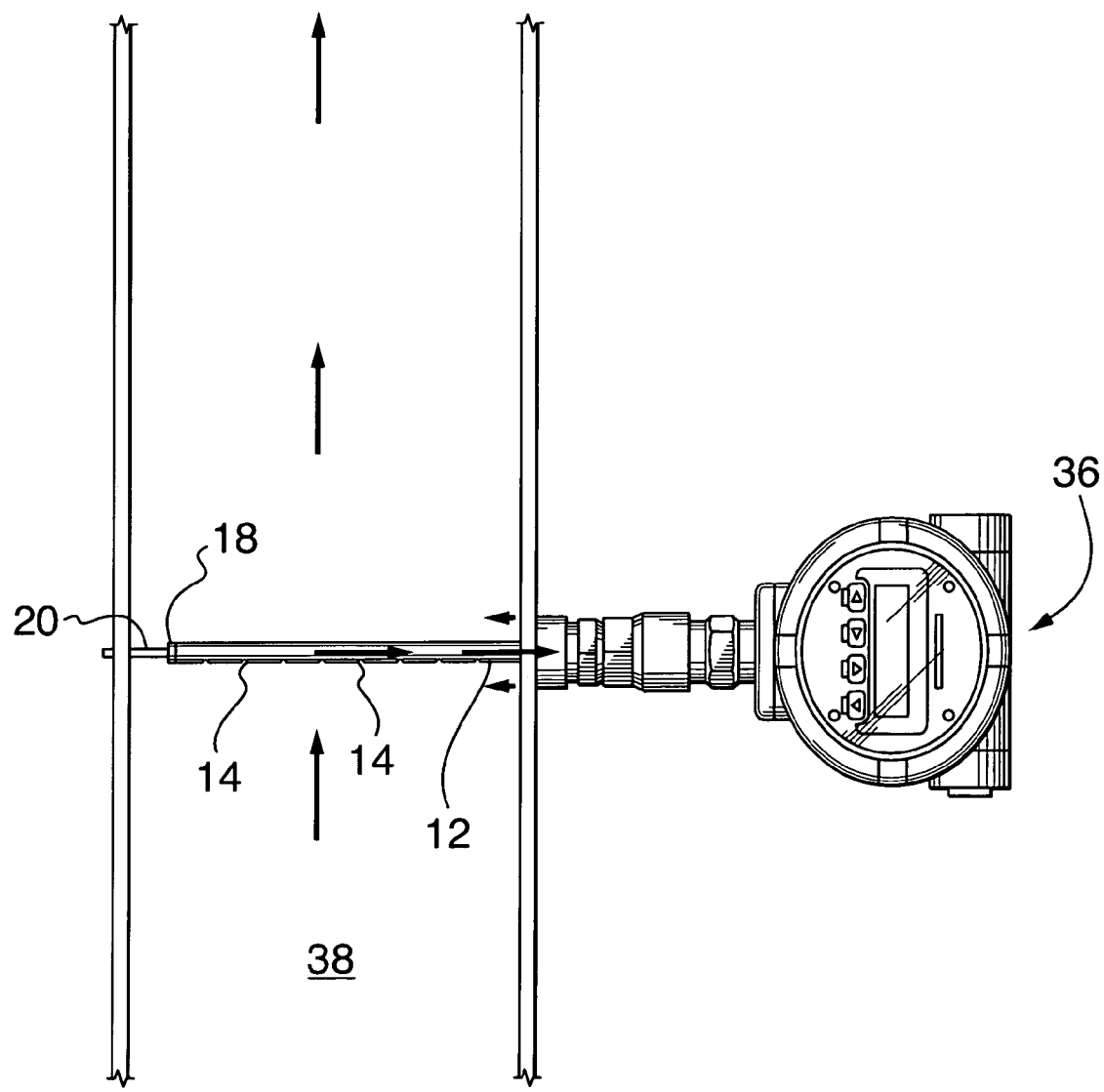
FIG. 3 is a view of the probe arrangement in situ.
Figure 4:
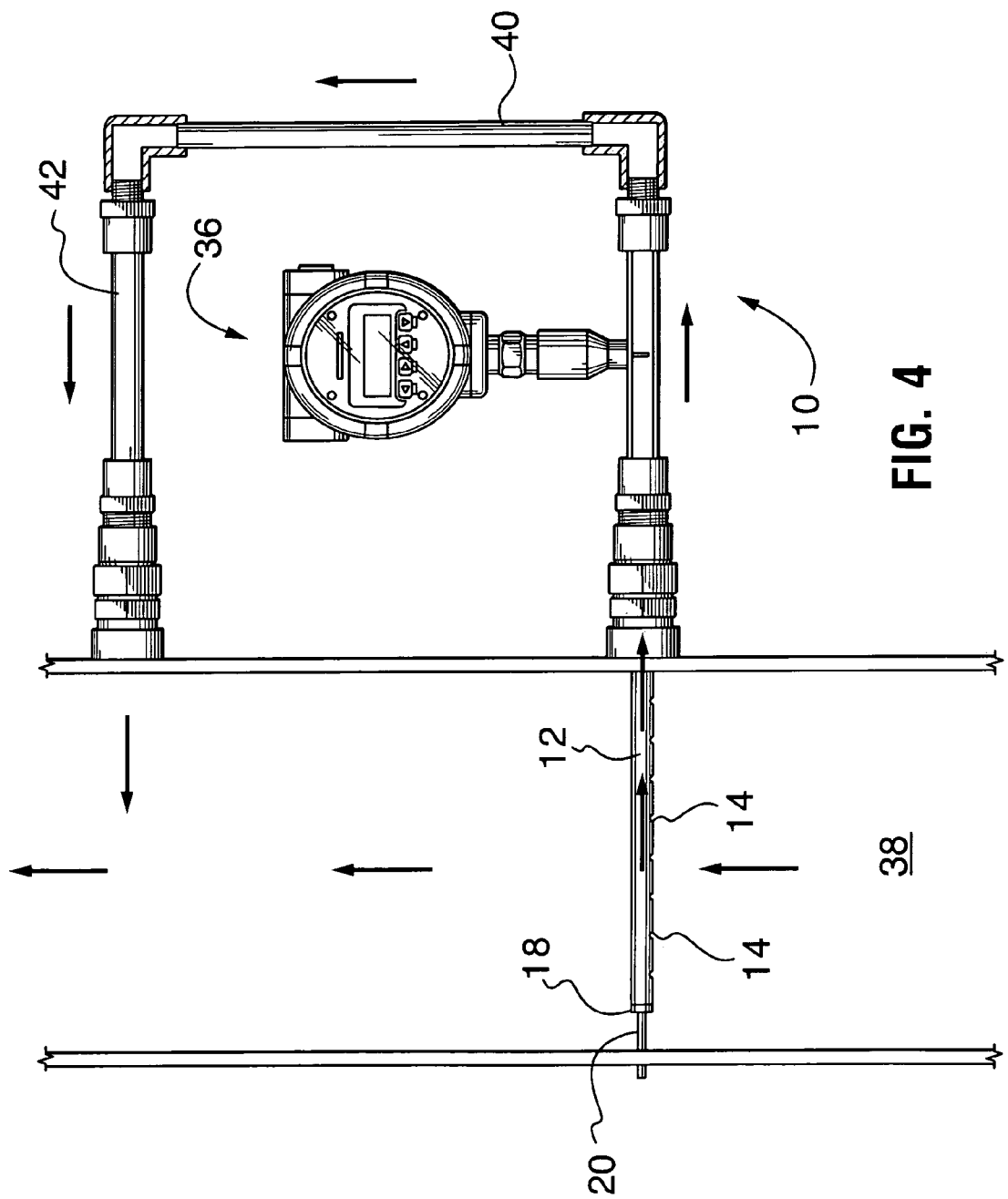
FIG. 4 is a view of the probe in an alternate embodiment.

FIG. 3 depicts the probe within a fluid conduit 38. Illustrated in the flow patterns of the fluid within the probe.

FIG. 4 illustrates a further embodiment of the probe 10 in which the probe is positioned within fluid conduit 38 directly within the fluid flow pattern of the conduit 38. As illustrated in the example, the fluid then travels through the probe 10, is metered by meter 36 and is returned by conduits 40 and 42 back into the fluid stream. Generally speaking, in use gas flow enters the probe tube 12 through apertures 14 as indicated in FIG. 2. The gas travels down the centre of tube 12 through sensor insert 24 and contacts the sensor 22 disposed therein. Once the gas flow is sensed the gas is discharged through openings 30 in insert 24 as indicted by arrows 32. The sensed gas is then discharged through openings 44 in tube 12. Once discharged through openings 44, the fluid is then returned to the environment from which it was initially sampled.

As the illustrations depict, the sensor is substantially proximate the apertures and effectively senses accumulated fluid flow that enters the apertures 14. This is eventually sensed and metered. In this manner, by the nature of the design of the probe a plurality of fluid streams are effectively amalgamated once they are accumulated and thus an average fluid flow is established from a variety of locations at different points of the lamina. In this manner, aberrations or inconsistencies in the flow due to localized eddy currents or other fluid spoiler situations do not affect the reading of fluid passing through the probe. This is in marked contrast to the arrangements in the prior art where the probes measured pressure and simply averaged the pressure over a certain distance. The present arrangement averages flow and therefore renders, overall, the irregularities in the flow to a minimum in view of the averaging.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A flow averaging probe for measuring fluid flow, comprising:

an elongate hollow probe;
  a plurality of apertures disposed on said probe for receiving individual fluid streams therethrough;
  sensor means adjacent said apertures for sensing accumulated fluid flow composed of said individual streams;
  transmitter means for transmitting sensed data from said sensors;
  signal processing means for processing transmitted data; and
  discharge means for discharging fluid sensed by said sensor means and of said probe.

2. The probe as set forth in claim 1, wherein said probe includes connection means for connecting a plurality of said probes together.

3. The probe as set forth in claim 1, wherein said transmitter means and said signal processing means are integral with said probe and mounted integrally therewith.

4. The probe as set forth in claim 1, wherein said apertures are equidistantly spaced along a longitudinal axis of said probe.

5. A flow averaging probe for measuring fluid flow in a conduit, comprising in combination:

a conduit for transporting a fluid;
an elongate hollow probe releasably connected within said conduit;
a plurality of apertures disposed on said probe for receiving individual fluid streams therethrough;
sensor means adjacent said apertures for sensing accumulated fluid flow composed of said individual fluid streams;
transmitter means for transmitting sensed data from said sensors;
signal processing means for processing transmitted data; and
discharge means for discharging fluid sensed by said sensor means and of said probe.

6. The combination as set forth in claim 5, wherein said probe includes connection means for connecting a plurality of said probes together.

7. The combination as set forth in claim 5, wherein said apertures are equidistantly spaced along a longitudinal axis of said probe.

8. The combination as set forth in claim 1, wherein said transmitter means and said signal processing means are integral with said probe and mounted integrally therewith.

9. A method of measuring fluid flow in a conduit, comprising:

providing a probe having a hollow elongate body with a plurality of apertures therethrough and sensor means adjacent said apertures, said apertures for receiving individual fluid streams therethrough;
positioning said probe within a fluid stream to be measured;
collating individual fluid streams from said apertures within said probe;
activating said sensor means by fluid entering said apertures to obtain data generated by a collated stream; and
averaging obtained data to determine a representative flow rate.

10. The method as set forth in claim 9, wherein fluid pressure is sensed at each aperture of said plurality of apertures.

11. The method as set forth in claim 9, further including the step of generating a flow profile with averaged data.

12. The method as set forth in claim 9, further including the step of correcting for variations in fluid pressure at each of said apertures.

13. The method as set forth in claim 9, further including the step of connecting a plurality of probes for determining flow data.

14. The method as set forth in claim 9, further including the step of averaging data from said plurality of said probes.

* * * * *